Patented Sept. 3, 1946

2,407,045

UNITED STATES PATENT OFFICE 2,407,045

MANUFACTURE OF PHENOLS OR SALTS THEREOF

Daniel Tyrer, Stockton-on-Tees, England

No Drawing. Application July 8, 1943, Serial No. 493,924. In Great Britain August 13, 1942

6 Claims. (Cl. 260—628)

This invention relates to the manufacture of phenols or salts thereof from salts of the corresponding sulphonic acids.

The customary fusion process for the manufacture of phenols from the corresponding sulphonic acids involves fusing the sulphonic acid salt with caustic alkali, and the reaction in the case of sodium benzene sulphonate, which may be taken as typical, is as follows:

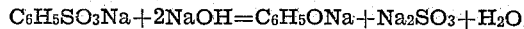

Thus, 2 molecular proportions of caustic soda are theoretically required for 1 molecular proportion of sulphonate, but in practice it is customary to use 2½ molecular proportions or more. In the manufacture of resorcinol from sodium benzene-1:3-disulphonate 4 molecular proportions of caustic soda are required according to theory, whereas in practice not less than 7, and usually about 14, molecular proportions are used.

If it is attempted to carry out the fusion process by adding the alkali sulphonate to the theoretical quantity of fused caustic alkali the reaction mixture assumes an undesirable thick semi-fused condition. If, again, the theoretical quantities of alkali sulphonate, and caustic alkali are mixed together beforehand and subsequently heated to bring about the reaction, the mixture tends to froth and swell up on reaching the reaction temperature.

I have now found that it is possible to produce phenols or salts thereof from the corresponding alkali metal sulphonates by reaction with substantially the theoretical quantity of caustic alkali without the above mentioned disadvantages, if an intimate solid mixture of the reactants is prepared containing an additional solid particulate substance selected from the group consisting of the oxides and hydroxides of calcium, barium, strontium and magnesium (all of such oxides and hydroxides being insoluble in fused caustic alkali) in such proportion, comprising at least 2 per cent to about 30 per cent of the weight of the sulphonic acid salt, that during the subsequent heating operation the reaction mixture does not froth or swell and remains in a substantially solid condition, and if the said solid mixture is heated at a temperature ranging from 350–400° C. to cause the sulphonic acid and caustic alkali to undergo reaction.

The term "phenols" is used herein in describing the invention to include naphthalenes and other hydroxyl-substituted aromatic or heterocyclic compounds which themselves and in the form of their corresponding sulphonates used as starting materials do not readily decompose or lead to side reaction at the reaction temperature required for the present process. Among the more especially suitable phenols there may be mentioned the hydroxy-benzenes, cresols, hydroxy-naphthalenes and hydroxy-pyridines.

The term "caustic alkali" as used herein and in the appended claims denotes only sodium hydroxide or potassium hydroxide.

For convenience the added solid substances defined above will be referred to hereinafter as "anti-frothing agents."

I have also found that the reaction may be conducted with the introduction of steam, and that then, in the case of a large number of phenols, the phenol, instead of remaining in the reaction residue as a phenolate, is removed from the reaction mixture by the steam in the form of the free phenol, and can be recovered from the aqueous condensate produced by condensing the issuing vapors. By using this method of operation, in the case of phenols capable of being removed from the reaction mixture by the steam, only half the quantity of caustic alkali is required for the reaction, that is to say only one molecular proportion of caustic alkali for each sulphonate radical in the sulphonic acid salt. In the case of sodium benzene sulphonate and caustic soda the reaction may then be represented as follows:

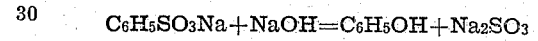

However also in this case, an addition of the kind described above is necessary, for if it is attempted to conduct the reaction with the theoretical proportion of caustic soda without such an addition, the mixture on reaching the reaction temperature suddenly swells up to form a frothy mass of great volume.

In the case of a phenol which cannot be removed by steam it remains in the reaction residue in the form of phenolate, whether steam is introduced or not. When the reaction is conducted without steam, in the case of phenols capable of being removed by steam, the bulk of the phenol remains in the reaction residue as phenolate but a small amount is expelled as the free phenol with the water vapour produced during the reaction, and may be recovered by condensing the issuing vapours. By conducting the reaction in a closed vessel so that the water vapour cannot escape the whole of the phenol can be retained as phenolate in the reaction residue. When the reaction is conducted so as to produce a phenolate, the latter may serve as a starting material for making other products so that it is not always necessary to convert it into the free phenol.

It will be understood that the reaction should be conducted in the absence of air in order to prevent oxidation of the reactants or of the products formed. The introduction of steam serves as a convenient means of securing this end. Alternatively, the reaction may be conducted in an atmosphere of hydrogen or other inert gas.

When the process is applied with the introduction of steam to the manufacture of phenols, such as phenol itself, which are capable of being removed from the reaction mixture by steam, the removal of the product from the reaction vessel as it is formed with the steam constitutes a further advantage. In the case of phenols, such as resorcinol, which cannot be removed by steam, the normal theoretical quantity of caustic alkali, that is to say two molecular proportions per sulphonate radical, is required whether steam is introduced or not. The introduction of steam then serves as a convenient means for excluding air from the reaction vessel, and also serves to remove any impurities of other phenols capable of removal by steam.

In the case of phenols, such as $\beta$-hydroxypyridine, which can be removed by steam, but with greater difficulty than, say, phenol itself, a higher rate of introduction of steam is required to remove them but even then the removal is slower than in the case of phenol itself. With such phenols a better expedient is to remove a part of the product with steam and recover the remainder from the reaction mixture. For this purpose the proportion of caustic alkali is reduced below the theoretical two molecular proportions per sulphonate radical to an extent appropriate to whatever proportion of the product it is desired to remove by steam. For example, 1.5 mols of caustic alkali will enable 50 per cent of the $\beta$-hydroxypyridine produced to be removed by steam. From the foregoing description it will be understood that the expression "theoretical quantity of caustic alkali" is used herein and in the appended claims to denote the quantity which is theoretically required under the conditions used, namely according to whether steam is introduced or not, and, in the former case, according to the amount of the phenol removed by the steam.

The rate at which the steam is introduced will depend on the nature of the phenol and the reactivity of the mixture. In general the rate of introduction should not exceed that required to obtain a satisfactory rate of removal of the phenol so that the latter is obtained in association with as little water as possible. In general a suitable rate for the introduction of steam per hour is 3-4 times the weight of the sulphonate undergoing reaction, but in the case of phenols which are not very readily removed, such as $\beta$-hydroxypyridine, a somewhat higher rate is of advantage.

Although the use of steam is not essential in the process of the invention, its use offers the following advantages: In the case of phenols capable of being removed by steam, the theoretical quantity of caustic alkali becomes one half of that required in the absence of steam. The product is obtained in association with water only. Side reactions are reduced or avoided by the rapid removal of the phenol from the reaction mixture. A part or the whole of the heat required for the reaction may be supplied by preheating the steam. It is also found that the use of steam leads to a speedier reaction.

Operating without the introduction of steam enables the phenolates, instead of the free phenols, to be produced, and enables a somewhat lower reaction temperature, for example 350° C. instead of 380° C. to be used.

The particular proportion, within the aforesaid range, of the anti-frothing agent used in any particular case depends largely on the nature of the agent used. When steam is introduced 20 per cent of calcium hydroxide or magnesium oxide calculated on the weight of the sulphonate has been found adequate, and even smaller proportions may be used without seriously affecting the result.

The minimum proportions required to prevent frothing and maintain the reaction mixture in a substantially solid condition may be considerably below the above-mentioned percentages. Thus, in the reaction between sodium benzene sulphonate and caustic soda with the introduction of steam there may be used 4-5 per cent of calcium hydroxide. When potassium benzene sulphonate is used instead of the sodium sulphonate only 2 per cent of calcium hydroxide is required. Without the introduction of steam, when using the sodium sulphonate, 6 per cent of calcium hydroxide suffices. In general it is advisable, however, to use considerably more than the minimum addition, for, while the latter prevents frothing and substantial fusion incipient fusion or sintering may occur which would hinder the removal of the phenol when steam is used, a larger addition improves the porosity of the reaction mixture. A larger addition also facilitates the drying of the mass when the reaction mixture is worked up into the form of a granular mass as described below. Generally speaking about 20-30 per cent of the anti-frothing agent or of a mixture of two or more such agents is satisfactory, whether or not steam is used.

The reaction is considerably assisted by ensuring that the reactants are in a state of intimate contact during the reaction. This intimate contact can be obtained very effectively by mixing together the ingredients of the reaction mixture in the presence of water, and, while stirring the mixture, evaporating the water completely or sufficiently to produce a solid granular mass which will not soften or cake on heating due to the presence of residual water. The soluble ingredients may be dissolved wholly or partially in the water, and may be brought into solution first and the agent added subsequently. A convenient method of mixing the ingredients in the presence of water is to mix all the ingredients, except the caustic alkali together in dry powdered form, and then mix them with a strong aqueous solution of the caustic alkali, the mixture then being evaporated to form a solid granular mass as described above. The evaporation of the water may, if desired, be carried out wholly or in its final stages in the reaction vessel before starting the reaction. Another method of bringing about the desired intimate contact is to briquette a mixture of the ingredients while in a moist condition. In each of the foregoing methods of mixing it is important to prevent the mixture from absorbing an appreciable amount of carbon dioxide from the atmosphere.

The alkali metal salt of the sulphonic acid may be the sodium or potassium salt, and a mixture of both salts may be used. Either sodium hydroxide or potassium hydroxide may be used as the caustic alkali. The speed of the reaction is especially high in the case of potassium sulphonates, and can be increased in the case of any alkali sulphonate by the addition of a potassium salt, more especially potassium chloride. There may also be mentioned potassium sulphite or potassium sulphate, each of which also acts as an anti-frothing agent. The use of a potassium salt as reaction accelerator is especially advantageous with sodium sulphonates as they do not react so rapidly as the potassium sulphonates. A very rapid reaction is obtained by reacting a potassium sulphonate with potassium hydroxide with the addition of a potassium salt as a reaction accelerator. Accordingly, an acceleration of the reaction can be secured by ensuring that the reaction mixture has a content of alkali metal radical consisting at least in part of potassium.

With regard to the reaction temperature, it has been found that when a mixture of 1 mol of sodium benzene sulphonate, 1 mol of caustic soda and 0.5 mol of calcium hydroxide is heated in a current of steam phenol begins to form slowly at about 350° C. The reaction becomes rapid at about 380° C. If 0.75 mol of potassium chloride is added to the above mixture the speed of the reaction at 350° C. is about 15 times faster than it is without the potassium chloride. In general a temperature of about 380° C. gives a suitably rapid reaction. Although the most suitable reaction temperature depends to some extent on the particular sulphonate used, it will generally lie within the range of 350–400° C. The anti-frothing agents do not affect the speed of the reaction in its initial stages, but when calcium hydroxide is used the reaction is more rapid in the later stages. It is of advantage to introduce the steam in preheated condition. By preheating the steam to a temperature above the reaction temperature the whole or a part of the heat required may be supplied.

Owing to the diminution in the rate at which the phenol is produced as the reactants are consumed, it is generally not of advantage to continue the reaction after about 90–95 per cent of the sulphonate has been converted. The unchanged sulphonate can be used in a fresh treatment. If the reaction is conducted as a continuous process by charging fresh reactants into the reaction vessel to replace the materials consumed, the initial high rate of phenol production can then be substantially maintained throughout the process. When the process is conducted as a batch treatment with steam it is advisable to reduce the rate of introduction of the steam to correspond with the diminution in the rate of phenol production.

The invention also includes the treatment of the reaction residue to convert alkali sulphite formed during the reaction into alkali sulphonate or caustic alkali or both for a fresh reaction, and to recover unchanged sulphonate and any added substances.

In order to convert alkali sulphite into alkali sulphonate a solution of the former may be treated with the free sulphonic acid and the sulphur dioxide formed expelled by boiling. If the sulphonic acid contains sulphuric acid the sulphate formed therefrom may be removed at a later stage. Preferably, however, the sulphuric acid is removed by adding calcium hydroxide or recovered calcium sulphite, removing the precipitated calcium sulphate by filtration, and adding alkali sulphite or alkali carbonate to the filtrate to precipitate the residual calcium sulphate. Instead of the free sulphonic acid its calcium or barium salt may be used, and the precipitated calcium or barium sulphite is then removed from the alkali sulphonate solution.

In order to convert alkali sulphite into caustic alkali a solution of the former may be boiled with calcium hydroxide or barium hydroxide. With calcium hydroxide the conversion is only partial, but it is advantageous owing to its low cost. As is well known the degree of causticisation depends on the concentration of the alkali sulphite, so that by suitably adjusting the concentration the desired degree of conversion can be obtained. The unchanged alkali sulphite can be readily deposited by concentrating the solution and then removed. The unchanged sulphite so recovered may be similarly treated to convert it into caustic alkali. The partial causticisation produced by calcium hydroxide may be supplemented as desired by using barium hydroxide in addition. Other methods of conversion may be used, for example, sodium sulphite may be converted into caustic soda by electrolysis in known manner.

When calcium hydroxide is used as the anti-frothing agent, and the reaction is conducted in steam with complete removal of the phenol formed, the reaction residue contains as soluble constituents, alkali sulphite, small quantities of caustic alkali and unchanged alkali sulphonate together with any potassium salt which may have been added to accelerate the reaction, and as insoluble constituents calcium sulphite and calcium hydroxide. The reaction residue is extracted with water and the insoluble calcium compounds are removed, for example, by filtration or by allowing the insoluble compounds to settle and decanting the supernatant liquid. During the extraction the quantity of caustic alkali increases owing to the causticisation of alkali sulphite by calcium hydroxide and the quantity of calcium sulphite increases correspondingly. In order to prepare a fresh batch of reaction mixture the extract solution, freed from insoluble compounds, may be concentrated to cause the deposition of a quantity of the alkali sulphite such that sufficient alkali sulphite and caustic alkali remains in solution to produce the desired quantity of sulphonate by reaction with sulphonic acid or alkaline earth sulphonate as described above. To the solution obtained after removing the deposited alkali sulphite and regenerating the desired quantity of sulphonate there is added the necessary quantity of caustic alkali and, after suitable concentration, the necessary quantity of calcium hydroxide. The caustic alkali so added may, if desired, be made by causticising as described above the alkali sulphite removed.

An alternative procedure is to add the required caustic alkali to the extract solution, and then deposit by concentration and remove substantially the whole of the alkali sulphite formed during the reaction. A part of the latter is used to make the required sulphonate and, if desired, the remainder may be used to make caustic alkali.

Another alternative is to treat the reaction residue, with or without removing the calcium compounds, with sufficient sulphonic acid to produce the alkali sulphonate required, and then, after removing any insoluble calcium compounds present, to concentrate the solution in order to deposit the alkali sulphite. The concentrating operation may be performed before or after adding the necessary quantity of caustic alkali, but if it is performed after such addition the deposition of the alkali sulphite is facilitated since the latter is less soluble in caustic alkali solution. The alkali sulphite so removed may be used for making the caustic alkali.

A still further alternative is to divide the reaction residue into two portions, and use one portion for making the alkali sulphonate and the other being either treated for the preparation of caustic alkali or discarded and replaced by fresh caustic alkali.

A further and preferred method is one which utilizes the calcium hydroxide or other alkaline earth metal hydroxide used as the anti-frothing agent for the regeneration of caustic alkali. For this purpose the reaction residue is mixed with water, and the aqueous liquor, without filtration, is boiled at such a concentration and, if necessary, with an addition of such further alkaline earth metal hydroxide as are necessary to cause the formation of substantially the whole of the caustic alkali required. After filtering the liquor, the excess alkali sulphite is deposited by concentrating the filtrate and is removed. The alkali sulphite so removed is used for preparing the necessary alkali sulphonate. The alkali sulphonate solution so obtained is then mixed with the alkaline mother liquor. After suitably concentrating the mixed solutions the necessary quantity of calcium hydroxide is added, and the whole is evaporated to produce a fresh reaction mixture of the original composition.

In the above methods any loss of alkali may be made good by the addition of fresh caustic alkali or alkali sulphite at a suitable stage in the procedure.

The sulphur dioxide which is liberated when alkali sulphite is treated with the free sulphonic acid to produce alkali sulphonate as described above may be used for making sulphuric acid for the production of sulphonic acid. When the reaction has been conducted with the introduction of steam, the quantity of sulphur dioxide so liberated is theoretically sufficient to furnish 50 per cent of the sulphuric acid required. However, when the reaction is conducted without steam, the sulphur dioxide so liberated is preferably used for converting phenolate into free phenol as described below, and could only be used for making sulphuric acid if some other acid, for example carbonic acid, where used for the latter conversion.

When the process is conducted without introducing steam, or when the phenol formed is not removed by the steam introduced, the phenol remains in the reaction residue in the form of the phenolate. Before working up the residue by one of the methods above described, it is desirable to recover the phenol therefrom. For this purpose the residue may be taken up with water, filtered to remove insoluble compounds, if necessary, and treated with an acid to decompose the phenolate. The liberated phenol may be removed in any suitable manner, for example, by simple physical separation, by distillation or by extraction with a suitable solvent. In the case of resorcinol it is advantageously extracted with ether, the ether removed from the extract solution by distillation, and the crude product purified by vacuum distillation.

Any suitable acid may be used for decomposing the phenolate, but it is preferable to use the sulphonic acid appropriate for the reaction or sulphurous acid as they they are not foreign to the process. When other acids are used it is desirable, with a view to utilising the alkali salt formed to regenerate caustic alkali or sulphonate, to select an acid whose alkali salt can be causticised by calcium hydroxide or decomposed by the appropriate sulphonic acid. Such an acid is carbonic acid.

Prior to the treatment with acid it may be desirable to remove the bulk of the alkali sulphite, as advantage can then be taken of its low solubility in the alkaline solution.

For working up the residue after the removal of the phenol the above described methods are applicable but there are now an additional one equivalent of alkali salt to be dealt with and an additional one equivalent of caustic alkali to be restored.

The preferred method is to liberate the phenol by means of sulphur dioixde, and, after removing the phenol, to causticise sufficient of the alkali sulphite with calcium hydroxide to yield the greater part or the whole of the caustic soda required. After filtration, the solution is concentrated until sufficient alkali sulphite is deposited for preparing the required amount of sulphonate. When the free sulphonic acid is used for preparing the sulphonate the sulphur dioxide liberated is used for decomposing the phenolate, if necessary, together with additional sulphur dioxide. The sulphonate solution and the causticised solution are combined and worked up into a fresh reaction mixture, if necessary with the addition of calcium hydroxide. Any deficiency of caustic alkali is made up by a fresh addition thereof.

When the phenol produced is removed with steam, the mixture of the phenol and steam issuing from the reaction vessel is condensed and the condensate may be worked up by known methods for recovering and purifying the phenol. When the phenol is insoluble or only slightly soluble in water simple physical separation may suffice. When it is appreciably soluble the portion in solution may be recovered by extraction with a solvent. In the case of phenol itself and many other phenols extraction with benzene or a similiar solvent is satisfactory, since the phenol is substantially wholly extracted thereby in a relatively dry state, and simple distillation suffices to separate and recover the solvent.

The residual liquor remaining after the extraction, which may contain small quantities of the phenol, may be used for the generation of steam required for the process. The residual phenol and any of the solvent which may be present may either be returned to the reaction vessel with the steam or concentrated as a residue in the still. In the latter case caustic alkali may be added to ensure the retention of the phenol in the still liquor. The concentrated liquor from the still may then be worked up by known methods for recovering the dissolved phenol.

Another method of dealing with the residual liquor remaining after extraction is to use it for dissolving the reaction residue when the latter is being worked up. Any residual phenol will then be returned to the process with the reconstituted reaction mixture. This procedure is advantageous because, as is well known, the presence of a phenol during the causticisation of such salts as alkali sulphates and alkali sulphites by means of calcium hydroxide materially assists the causticisation. The phenol so present is converted into alkali phenolate, in which form it is returned to the reaction in the reconstituted reaction mixture. During the reaction in the presence of steam the phenolate is decomposed into the free phenol and caustic alkali.

In some cases, for example, when $\beta$-hydroxypyridine is being made, the whole of the condensate containing the phenol may be transferred to the still for generating steam and at the same time obtaining a phenolic concentrate. Alternatively the condensate may be separately concentrated by distilling the water.

As stated above, it is desirable that the rate at which the steam is passed through the reaction vessel should be kept low so as to obtain a condensate as rich as possible in the phenol. In the case of some phenols a further enrichment can be obtained by only partially condensing the vapours from the reaction vessel so as to produce a condensate having a higher concentration of the phenol. The uncondensed steam may be returned to the reaction vessel for reuse.

The crude phenol obtained by the foregoing methods of recovery may be purified in any suitable manner, for example, by distillation or by crystallisation from a suitable solvent.

Owing to the repeated working up of the reaction residue to form fresh reaction mixture the latter will become progressively contaminated with impurities present in the materials or formed in the process. For example, the oxidation of sulphite to sulphate will tend to cause the accumulation of alkali sulphate in the mixture. The residue may therefore occasionally be treated wholly or in part by known methods to remove such impurities. or the accumulation of impurities may be prevented by occasionally discarding a small portion of the residue and replacing the discarded portion with fresh materials.

The following examples illustrate the invention the parts being by weight:

*Example 1*

100 parts of sodium benzene sulphonate, 30 parts of potassium chloride and 22.2 parts of caustic soda are mixed in aqueous solution with 20 parts of calcium hydroxide. The mixture is evaporated while stirring to produce a granular solid mass which does not soften on heating. The granular mass is heated in a reaction vessel at 380° C. in a slow current of preheated steam. The issuing vapours are condensed to a mixture of phenol and water. After about one hour the production of phenol is very slow and about 90 per cent of the sulphonate has undergone reaction.

The aqueous condensate is extracted with benzene, the benzene is removed from the extract solution by distillation, and the phenol is rectified by distillation. Approximately 45 parts of phenol are obtained, which represents a yield of 96 per cent calculated on the sulphonate which reacts. By recovering the small quantity of phenol which remains in the aqueous liquor after the extraction the yield is brought up to 97 per cent.

The residue remaining in the reaction vessel is extracted with a minimum quantity of hot water, the solution is filtered to remove the insoluble calcium compounds, and the filtrate is cooled, if required after concentration, to crystallise out a portion of the sodium sulphite present. A sufficient quantity of benzene sulphonic acid is added to the mother liquor to provide 100 parts of the sodium sulphonate including the 10 parts of unchanged sulphonate already present. After boiling the solution to expel the sulphur dioxide the necessary quantities of caustic soda and calcium hydroxide for a further reaction are added, and the solution is evaporated as described above to provide a fresh batch of granular reaction mixture.

Alternatively, the reaction residue may be worked up as follows: The residue is mixed with a quantity of water sufficient to form a solution containing about 110 grams of sodium sulphite per litre. The mixture is boiled to bring about the causticisation of about half the sulphite by means of the calcium hydroxide present in the residue. The calcium sulphite is removed by filtration, and the alkaline filtrate is concentrated until the bulk of the remaining sodium sulphite is deposited. The latter is removed and boiled in solution with 79 parts of benzene sulphonic acid, whereby a solution containing 90 parts of sodium benzene sulphonate is obtained. Should there be a deficiency of sodium sulphite for this conversion, the deficiency is made up by the addition of fresh sodium sulphite or sodium carbonate. The resulting sulphonate solution, after suitable concentration, is mixed with the alkaline solution remaining after the removal of the sodium sulphite. 20 parts of calcium hydroxide are added to the mixture, which, after making good any deficiency of caustic soda, is used for making a fresh batch of reaction mixture.

*Example 2*

An aqueous solution containing 100 parts of potassium benzene sulphonate, 28.6 parts of caustic potash and 30 parts of potassium sulphite (residual sulphite from a previous operation) is suitably concentrated and then mixed with 20 parts of calcium hydroxide to form a slurry. The slurry is heated while stirring to produce a nearly dry granular solid, care being taken to avoid the absorption of carbon dioxide from the air. The solid mixture is then heated in a reaction vessel so that the temperature rises from 350° C. to 380° C. while a slow current of steam is passed through the mixture at a rate of about 300 parts of steam per hour. The vapours which issue from the reaction vessel are condensed and form a milky suspension of phenol in water. After about 1½ hours the production of phenol is very slow, and about 95 per cent of the sulphonate has been converted into phenol, so that the reaction is stopped. The condensate contains approximately 42.5–44.5 parts of phenol, the yield being about 98 per cent calculated on the sulphonate which undergoes reaction.

The condensate is extracted with about 100 parts of benzene, the benzene solution is separated and distilled to recover the benzene. The phenol which remains behind is fairly pure and may be further purified by distillation. The greater part of the phenol is recovered in this way, the remainder being present in the aqueous residue left after the extraction with benzene. This residual phenol may be recovered by using the aqueous residue to generate steam for the process or may be returned to the process by using the aqueous residue to dissolve the solid reaction residue.

The solid reaction residue, which contains about 106 parts of potassium sulphite is treated with a quantity of water sufficient to produce a potassium sulphite solution having a concentration of about 220 grams per litre. The mixture is boiled and the calcium hydroxide present causticises so much of the potassium sulphite as to produce the original 28.6 parts of caustic potash. The calcium sulphite is removed by filtration, and the filtrate is concentrated to deposit approximately 38 parts of unchanged potassium sulphite. The potassium sulphite thus deposited is used to prepare 95 parts of potassium benzene sulphonate. For this purpose, the potassium sulphite is dissolved in water, and the solution is added to a solution of 76.5 parts of benzene sulphonic acid together with a sufficient quantity of calcium hydroxide or calcium sulphite to convert the free sulphuric acid associated with the sulphonic acid into calcium sulphate. The mixture is boiled to expel the sulphur dioxide produced and then filtered to remove the calcium sulphate. A very small quantity of potassium sulphite or potassium carbonate is added to the filtrate to precipitate the calcium sulphate remaining in solution. The solution is allowed to settle and is then suitably concentrated. The concentrated solution is mixed with the causticized solution. By adding 20 parts of calcium hydroxide to the combined solutions the composition of the original reaction mixture is restored.

Example 3

100 parts of potassium benzene-meta-disulphonate containing 8 per cent of the mono-sulphonate are mixed in aqueous solution with 70 parts of caustic potash and evaporated with the addition of 30 parts of calcium hydroxide to produce a solid granular mass. The latter is heated at a temperature of 380° C. for 5–6 hours in a slow current of steam. The condensate collected during this period contains about 3.7 parts of phenol. The reaction residue is cooled out of contact with the air, taken up with hot water, and the aqueous mixture is filtered to remove calcium compounds. The filtrate is concentrated to a small volume to facilitate the subsequent extraction, and is then neutralised by introducing sulphur dioxide gas. The mixture is filtered to remove a little carbonaceous matter which separates, and the clear solution is exhaustively extracted with ether. After removing the ether and a little water by distilling the ethereal solution 28 parts of a crude product are obtained which, on fractional distillation, yields approximately 23.5 parts of substantially pure resorcinol leaving 4.5 parts of a by-product of high boiling point.

The aqueous mother liquor containing mainly potassium sulphite may be worked up as described in the preceding examples to prepare a fresh batch of reaction mixture.

Example 4

100 parts of sodium naphthalene α-sulphonate are mixed in aqueous solution with 24 parts of potassium chloride and 17.5 parts of caustic soda. 16 parts of calcium hydroxide are added, and the whole is evaporated to produce a solid granular mass, care being taken to avoid the absorption of carbon dioxide from the atmosphere. The granular mass is then heated at 370° C. in a slow current of superheated steam, and the issuing vapours are condensed to form a mixture of α-naphthol and water. After heating for about one hour the reaction practically ceases and about 90 per cent of the sulphonate is converted.

The aqueous condensate is extracted with benzene, and the extract solution is distilled to remove the benzene. The residue consists of 52 parts of α-naphthol, which represents a yield of 92 per cent on the converted sulphonate. The product may be further purified by distillation under reduced pressure.

The reaction residue is extracted with water, filtered to remove insoluble calcium compounds and the filtrate is concentrated sufficiently to remove by crystallisation a part of the sodium sulphite present. A solution of calcium naphthalene α-sulphonate is added to the mother liquor in a quantity sufficient to produce a total of 100 parts of the sodium sulphonate. The precipitated calcium sulphite is removed by filtration, the necessary quantities of caustic soda and calcium hydroxide for a further reaction are added to the filtrate, and the latter is worked up into a granular mass as described above to provide a fresh batch of reaction mixture.

Example 5

β-naphthol is prepared from sodium naphthalene β-sulphonate by the procedure described in Example 4. The only differences are that the temperature is 380–390° C., and the reaction is stopped when 85 per cent of the β-sulphonate has reacted, since it is difficult to carry the reaction to the 90 per cent stage. The above mentioned 85 per cent stage is reached after heating for 2–3 hours. The quantity of crude β-naphthol obtained after extracting with benzene amounts to approximately 50 parts, representing a yield of 94 per cent on the converted sulphonate.

I claim:

1. A process for the manufacture of phenols or salts thereof which comprises, preparing an intimate solid mixture of an alkali metal salt of the sulphonic acid corresponding to the phenol desired, a caustic alkali in substantially the theoretical quantity and an additional particulate solid substance selected from the group consisting of the oxides and hydroxides of calcium, barium, strontium and magnesium, in such a proportion, comprising at least 2 per cent to about 30 per cent of the weight of the sulphonic acid salt, that during the subsequent heating operation the reaction mixture does not froth or swell and remains in a substantially solid condition, and then heating the said solid mixture at a temperature ranging from 350 to 400° C. to cause the sulphonic acid salt and caustic alkali to undergo reaction.

2. A process for the manufacture of phenols or salts thereof which comprises, preparing an intimate solid mixture of an alkali metal salt of the sulphonic acid corresponding to the phenol desired, a caustic alkali in substantially the theoretical quantity and an additional particulate solid substance selected from the group consisting of the oxides and hydroxides of calcium, barium, strontium and magnesium, in such a proportion, comprising at least 2 per cent to about 30 per cent of the weight of the sulphonic acid salt, that during the subsequent heating operation the reaction mixture does not froth or swell and remains in a substantially solid condition, and then heating the said solid mixture in a current of steam at a temperature ranging from 350 to 400° C. to cause the sulphonic acid salt and caustic alkali to undergo reaction.

3. A process for the manufacture of phenols or salts thereof which comprises, mixing together in the presence of water an alkali metal salt of the sulphonic acid corresponding to the phenol desired, a caustic alkali in substantially the theoretical quantity and an additional particulate solid substance selected from the group consisting of the oxides and hydroxides of calcium, barium, strontium and magnesium, in such a proportion, comprising at least 2 per cent to about 30 per cent of the weight of the sulphonic acid salt, that during the subsequent heating operation the reaction mixture does not froth or swell and remains in a substantially solid condition, stirring the mixture and simultaneously evaporating sufficient water therefrom to produce a solid granular mass which is incapable both of softening and caking on heating due to the presence of residual water, and then heating the said granular mass in a current of steam at a temperature ranging from 350 to 400° C. to cause the sulphonic acid salt and caustic alkali to undergo reaction.

4. A process for the manufacture of phenols or salts thereof which comprises, preparing a moist mixture of an alkali metal salt of the sulphonic acid corresponding to the phenol desired, a caustic alkali in substantially the theoretical quantity and an additional particulate solid substance selected from the group consisting of the oxides and hydroxides of calcium, barium, strontium and magnesium, in such a proportion, comprising at least 2 per cent to about 30 per cent of the weight of the sulphonic acid salt, that during the subsequent heating operation the reaction mixture does not froth or swell and remains in a substantially solid condition, forming the moist mixture into briquettes, and then heating the said briquettes in a current of steam at a temperature ranging from 350 to 400° C. to cause the sulphonic acid salt and caustic alkali to undergo reaction.

5. A process for the manufacture of phenols or salts thereof which comprises, preparing an intimate solid mixture of an alkali metal salt of the sulphonic acid corresponding to the phenol desired, a caustic alkali in substantially the theoretical quantity and an additional particulate solid substance selected from the group consisting of the oxides and hydroxides of calcium, barium, strontium and magnesium, in such a proportion, comprising at least 2 per cent to about 30 per cent of the weight of the sulphonic acid salt that during the subsequent heating operation the reaction mixture does not froth or swell and remains in a substantially solid condition, preparing said solid mixture so that it includes a content of alkali metal radical consisting at least in part of potassium, and then heating the said solid mixture at a temperature ranging from 350 to 400° C. to cause the sulphonic acid salt and caustic alkali to undergo reaction.

6. A process for the manufacture of phenols or salts thereof which comprises, preparing an intimate solid mixture of an alkali metal salt of the sulphonic acid corresponding to the phenol desired, a caustic alkali in substantially the theoretical quantity and an additional particulate solid substance selected from the group consisting of the oxides and hydroxides of calcium, barium, strontium and magnesium, in such a proportion, comprising at least 2 per cent to about 30 per cent of the weight of the sulphonic acid salt that during the subsequent heating operation the reaction mixture does not froth or swell and remains in a substantially solid condition, preparing said solid mixture so that it includes a content of alkali metal radical consisting at least in part of potassium, and then heating the said solid mixture in a current of steam at a temperature ranging from 350 to 400° C. to cause the sulphonic acid salt and caustic alkali to undergo reaction.

DANIEL TYRER.